July 27, 1954     P. D. LLOYD     2,684,721
CONTROL FOR THE BLADES OF AIRCRAFT ROTORS
Filed Nov. 2, 1951     2 Sheets-Sheet 1
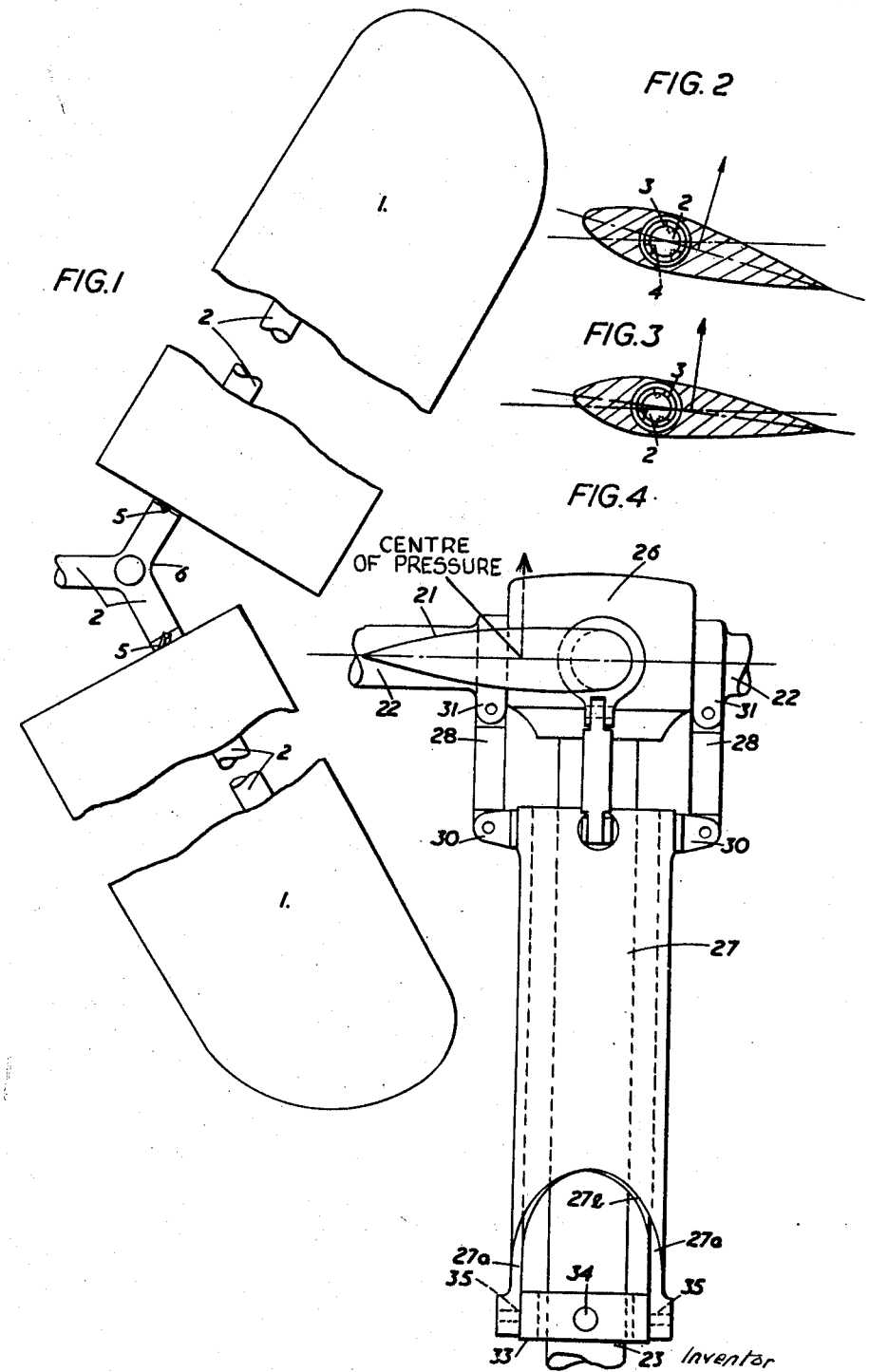

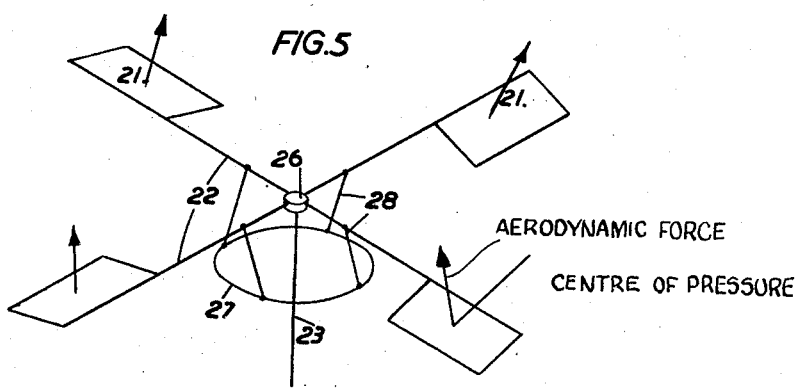
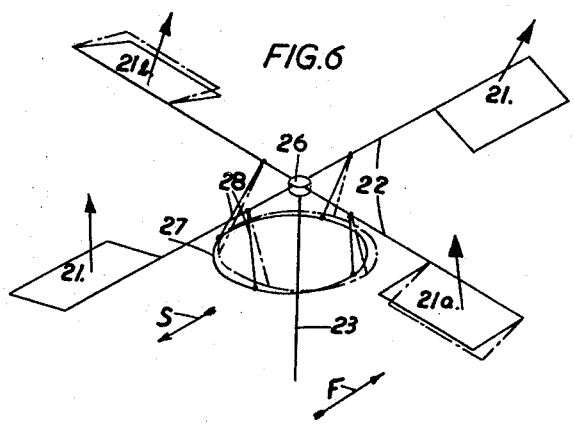
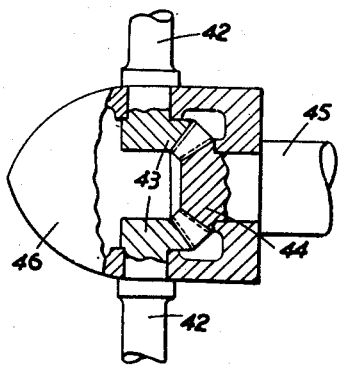

Patented July 27, 1954

2,684,721

UNITED STATES PATENT OFFICE 2,684,721

CONTROL FOR THE BLADES OF AIRCRAFT ROTORS

Patrick David Lloyd, London, England

Application November 2, 1951, Serial No. 254,606

3 Claims. (Cl. 170—160.13)

1

This invention relates to controls for the blades of rotors and airscrews for aircraft, and it is an object of the invention to provide simple yet reliable pitch control means for such rotors and airscrews.

By the present invention, control means are furnished which are governed by the rotation of the rotor or airscrew and are capable, in the case of the lift rotor of a helicopter or autogiro, of providing the appropriate cyclical pitch changes as well as overall change of mean pitch with change of angular velocity.

According to the present invention an aircraft rotor or airscrew includes one or more blades rotatably mounted by shafts radiating from a central hub, the neutral axis or mean centre of pressure of at least one blade being located to the rear of the axis of the respective shaft so that during operation the air pressure urges the blade towards the position of zero or minimum pitch, and governing means, controlled by the conditions obtaining in the drive, adapted to urge each blade to rotate on its shaft in the opposite direction and increase its pitch or angle of attack, the arrangement being such that in operation the or each blade takes up a position where these two opposing forces are balanced. In the case of a lift rotor during translatory motion, this position varies cyclically during each revolution. The term "centre of pressure" of a blade as used in this specification signifies that point within the blade through which the total aerodynamic forces may be presumed to act.

The governing means may be arranged to respond to centrifugal force exerted by one or each blade or by a body rotating therewith. Alternatively such means may respond to the torque set up in the drive between the rotor and its driving motor.

Where the invention is applied to aircraft driving airscrews or propellers, in which cyclical changes of pitch are not required, it may be preferable to link all the blades mechanically so that they change pitch in unison.

Three specific embodiments will now be described by way of example with reference to the accompanying schematic drawings in which:

Fig. 1 is a fragmentary plan view of a helicopter or autogiro lift rotor according to the first embodiment, Figs. 2 and 3 being sections of a retreating and advancing blade respectively.

Fig. 4 is an elevation of the driving shaft and rotor head of a lift rotor according to the second embodiment, Figs. 5 and 6 being diagrammatic representations of the action of the device for overall and cyclical pitch control respectively.

Referring now to the drawings, and more particularly to Figs. 1 to 3, each blade 1 is capable of sliding along its shaft 2 for a short distance. As it slides, it is forced to rotate about the shaft 2 by a cage 3 attached to the blade and having ball bearings 4 which run in helical grooves 5 on the shaft. The direction of rotation is such that motion of the blade 1 away from the rotor hub 6 increases its angle of attack.

Operation of the device will first be described with reference to vertical upward motion of the aircraft. As the rotor commences to turn, centrifugal force will cause the blades 1 to slide outwards, increasing their angle of attack and hence their lift. The aerodynamic force on each blade, acting through the centre of pressure, will then exert a moment about the shaft 2 tending to decrease the angle of attack. The blade will take up a position such that the centrifugal force transmitted through the helical grooves 5 and the aerodynamic force balance one another, and the lift will be constant for a given speed. An increase in speed of rotation will increase the centrifugal force, the angle of attack and the aerodynamic force until the balance is regained at a new pitch position.

Considering now horizontal motion of the aircraft with the rotor at constant speed of rotation, the air speed of an advancing blade (Fig. 2) will increase initially, and with it the aerodynamic force. The centrifugal force is unaltered, therefore the blade angle will decrease until balance is restored, i. e. until the aerodynamic force is reduced to its former value. On the other hand a retreating blade (Fig. 3) in a similar manner, will increase its angle of attack until the aerodynamic force is at its former value. These changes are gradual and take place in a cyclical manner during each complete revolution without the aid of a conventional cam and follower arrangement.

Referring now to the construction of Figs. 4 to 6, a driving shaft 23 carries a rotor head 26 with four rotatable blades 21 which are so arranged that their centres of pressure are some distance behind their pivotal axes. The head 26 is free to rotate on the shaft 23, and the drive is transmitted from the shaft to the head through a sleeve 27 connected at its upper end to the movable blades in such a way that any rotation of the head 26 relative to the sleeve and shaft alters the pitch of the blades 21. The connection may be through gearing such as a contrate pinion engaging spur gears, or other suitable means, and in the example shown it is effected by means of four links or connecting rods 28 each of which has its ends pivotally attached to lugs 30 and 31 projecting from the top of the sleeve 27 and from the root of a blade shaft 22 respectively. The lower lugs 30 are rotatable about radial axes in relation to the sleeve 27 so as to constitute universal joints. On the other hand each upper lug 31 is rigid with its shaft 22, which in this embodiment is rotated with its blade, and only permits rocking of the link 28 in a plane passing through the axis of the shaft 22, so that any relative rotation between the sleeve 27 and head 26 causes tilting of the blades 21. The sleeve 27 has an internal diameter greater than the diameter of the shaft 23 and has its lower end attached to such shaft by a universal gimbal coupling 33, 34, 35 so as to permit the upper end of the sleeve 27 a degree of lateral movement in relation to the shaft for the purpose explained hereafter.

Such gimbal coupling includes a ring 33 tiltably mounted on a pivot 34 projecting from the shaft 23, and lugs 35 projecting from the ring at right angles to the pivot 34. The lugs 35 act as pivots for forks 27A obtained by cutting away the sleeve 27 at 27B.

The action of the device is as follows:

In hovering flight, as illustrated by Fig. 5, the rotor-head 26, owing to the drag of the blades 21, will tend to lag behind the sleeve 27, causing an increase of pitch in the blades. The aerodynamic force on the blades will tend to decrease the pitch, and the blade will take up a position such that these two forces balance one another. An increase of torque (and therefore of drag) will increase the pitch until the increasing aerodynamic force brings about a new state of balance.

The aforementioned lateral movement of the upper end of the sleeve makes possible cyclic pitch adjustment.

In horizontal flight an advancing blade 21 has an increased air speed and an increased aerodynamic force, which, acting against the given torque, will tend to decrease pitch and displace the sleeve 27 rearwards until balance is regained. A retreating blade 21 has a decreased air speed and a decreased aerodynamic force, which, acting against the same torque, will tend to increase pitch and displace the sleeve rearwards until balance is regained.

Thus the combined effect will be that the sleeve will be automatically displaced rearwards until the aerodynamic force on the blades is constant all round the cycle.

The action is illustrated by Fig. 6 wherein an arrow S indicates tilting of the top of the sleeve 27 to a rearward position eccentric of the shaft 23, the direction of flight being indicated by an arrow F. The hovering or symmetrical position of the parts is shown in dotted lines, and from this it can be seen that the advancing blade 21A has a smaller angle of attack than the retreating blade 21B.

In the event of engine failure, driving torque would disappear. The aerodynamic force on the blades, being unopposed, would at once bring them to zero pitch, forcing the sleeve into alignment with the shaft 23 and rotor head 26. However, the incorporation of suitable stops in the rotor-head bearing would arrest the rotor-head just short of alignment, i. e. the blades would retain a slight degree of pitch, suitable for auto-rotation. The sleeve 27 would still be free to move laterally and give cyclic pitch adjustment on the drive being restored or on positive displacement of the sleeve being effected as described hereinafter.

If desired, the shaft and sleeve arrangement of Figs. 4 to 6 may be reversed, the shaft 23 being made hollow to enclose a central shaft replacing the sleeve 27.

In the examples of Figs. 1–3 and 4–6, control of the forward motion of the aircraft may be obtained by varying the inclination of the axis of the hub or rotor head or by a separate driving or tractor airscrew. On the other hand, in the arrangement of Figs. 4–6, positive cyclic pitch control can be provided by positive displacement of the sleeve. For instance, displacement of the sleeve to the right (looking in the direction of flight) would increase pitch at the rear of the rotor disc and decrease it at the front, giving forward motion of the aircraft. By leaving the sleeve free to move in the fore-and-aft plane, the automatic adjustment of pitch to compensate for the forward motion could still be obtained if required. Alternatively, the fore-and-aft motion of the sleeve could also be restrained or modified to give lateral control of the aircraft.

The embodiments of Figs. 1 to 6 may be applied to airscrews not requiring cyclical pitch changes, in which case all the blades may be ganged together to ensure uniform adjustment, the control being provided, if desired, by one blade only. On the other hand the invention is also applicable to counterweighted single-blade airscrews.

What I claim is:

1. An aircraft lift rotor comprising in comnation a main shaft, a central hub rotatably mounted on said main shaft, blade shafts radiating from said hub, blades rotatably mounted by said blade shafts, a sleeve surrounding said main shaft, one end of said sleeve being movable transversely to said main shaft while the other end is connected to the main shaft by a universal joint and restrained against rotation relatively thereto, and a link radiating from each blade root with its end connected to said sleeve by a universal joint, each of said links being rockable in relation to its blade root mounting while being arranged to impart to the blade such angular movement as the blade may perform around the blade axis.

2. An aircraft lift rotor comprising in combination a main shaft, a central hub rotatably mounted on said main shaft, blade shafts radiating from said hub, blades rotatably mounted by said blade shafts, a sleeve surrounding said main shaft, one end of said sleeve being movable transversely to such main shaft while the other end is connected to said main shaft by a universal joint and restrained against rotation relatively thereto, and means connecting each blade root to the sleeve such that transverse movement of the sleeve in relation to the main shaft effects angular movement of the blades.

3. An aircraft lift rotor according to claim 2 wherein the sleeve is restrained against rotation relative to the main shaft by a gimbal coupling at one end of the sleeve which permits the other end to move transversely in relation to the said main shaft to effect angular movement of the blades.

References Cited in the file of this patent

UNITED STATES PATENTS

| Number | Name | Date |
| --- | --- | --- |
| 1,036,122 | Kellogg | Aug. 20, 1912 |
| 1,875,998 | Everts | Sept. 6, 1932 |

FOREIGN PATENTS

| Number | Country | Date |
| --- | --- | --- |
| 964,695 | France | Feb. 1, 1950 |